United States Patent
Billstein et al.

(10) Patent No.: US 12,346,100 B2
(45) Date of Patent: Jul. 1, 2025

(54) SYSTEMS AND METHODS FOR DETECTING MANUFACTURING ANOMALIES

(71) Applicant: Ford Global Technologies, LLC, Dearborn, MI (US)

(72) Inventors: Andreas Billstein, Nordrhein Westfalen (DE); Illa Kesten-Kuehne, Gummersbach (DE); Hessel van Dijk, Roesrath (DE); Michael Higgins, Witham (GB)

(73) Assignee: Ford Global Technologies, LLC, Dearborn, MI (US)

( * ) Notice: Subject to any disclaimer, the term of this patent is extended or adjusted under 35 U.S.C. 154(b) by 789 days.

(21) Appl. No.: 17/545,529

(22) Filed: Dec. 8, 2021

(65) Prior Publication Data
US 2023/0176556 A1   Jun. 8, 2023

(51) Int. Cl.
*G05B 19/418* (2006.01)
*G06F 18/2113* (2023.01)
(Continued)

(52) U.S. Cl.
CPC ... *G05B 19/41885* (2013.01); *G05B 19/4183* (2013.01); *G05B 19/4188* (2013.01);
(Continued)

(58) Field of Classification Search
CPC .......... G05B 19/41885; G05B 19/4183; G05B 19/4188; G05B 2219/32193;
(Continued)

(56) References Cited

U.S. PATENT DOCUMENTS

| | | |
|---|---|---|
| 10,339,784 B2 | 7/2019 | Borutta et al. |
| 2007/0156471 A1* | 7/2007 | Moghaddam ....... G06F 18/2132 705/37 |

(Continued)

FOREIGN PATENT DOCUMENTS

WO   2023007825 A1   2/2023

OTHER PUBLICATIONS

Ester, Martin, et al. "A density-based algorithm for discovering clusters in large spatial databases with noise." kdd. vol. 96. No. 34. 1996 (Year: 1996).*

(Continued)

*Primary Examiner* — Omar F Fernandez Rivas
*Assistant Examiner* — Michael C. Lee
(74) *Attorney, Agent, or Firm* — Haley Guiliano LLP

(57) ABSTRACT

Systems and methods are described for training a model for detecting manufacturing anomalies. A test response parameter is identified at a computing device, and a first plurality of component waveforms associated with the test response parameter are received at the computing device. Each waveform of the plurality of waveforms comprises a plurality of datapoints. A model is generated at the computing device, and the model is trained at the computing device and on the first plurality of component waveforms, thereby generating one or more parameters associated with the model. A second plurality of component waveforms associated with the test response parameter is received, and the trained model is accessed. It is indicated using the trained model, whether any of the second plurality of component waveforms comprises an anomaly. For each indicated waveform, the indicated waveform is reviewed and, for each reviewed waveform not comprising an anomaly, the waveform is labelled.

13 Claims, 6 Drawing Sheets

(51) Int. Cl.
*G06F 18/214* (2023.01)
*G06F 18/23* (2023.01)

(52) U.S. Cl.
CPC ...... *G06F 18/2113* (2023.01); *G06F 18/2155* (2023.01); *G06F 18/23* (2023.01)

(58) Field of Classification Search
CPC .......... G05B 19/41875; G05B 23/0243; G05B 17/02; G06F 18/2113; G06F 18/2155; G06F 18/23
See application file for complete search history.

(56) References Cited

U.S. PATENT DOCUMENTS

| | | | |
|---|---|---|---|
| 2016/0203036 A1 | 7/2016 | Mezic et al. | |
| 2018/0231969 A1 | 8/2018 | Noda et al. | |
| 2019/0113741 A1* | 4/2019 | Kito | G03F 7/20 |
| 2019/0122138 A1* | 4/2019 | Li | G06Q 10/20 |
| 2019/0251471 A1* | 8/2019 | Morita | G06F 16/583 |
| 2019/0302707 A1* | 10/2019 | Guo | G05B 23/024 |
| 2020/0104639 A1 | 4/2020 | Didari et al. | |
| 2020/0272112 A1 | 8/2020 | Carullo et al. | |
| 2020/0311576 A1* | 10/2020 | Yamaguchi | G06N 20/10 |
| 2020/0371512 A1* | 11/2020 | Srinivasamurthy | G06V 20/70 |
| 2021/0082098 A1 | 3/2021 | Kumbhare et al. | |
| 2021/0142456 A1 | 5/2021 | Varga et al. | |
| 2021/0174408 A1* | 6/2021 | Usui | G06T 1/20 |
| 2022/0215149 A1* | 7/2022 | Hsu | G06F 30/398 |
| 2022/0299987 A1 | 9/2022 | Lee | |
| 2022/0317669 A1* | 10/2022 | Rathore | G06F 30/27 |
| 2022/0318667 A1* | 10/2022 | Babu Balasubramani | G06N 3/08 |
| 2023/0075600 A1* | 3/2023 | Ma | G06N 3/045 |

OTHER PUBLICATIONS

Hsieh, Ruei-Jie, et al. "Unsupervised online anomaly detection on multivariate sensing time series data for smart manufacturing." 2019 IEEE 12th conference on service-oriented computing and applications (SOCA). IEEE, 2019, pp. 90-97 (Year: 2019).*

Essien, Aniekan, et al. "A deep learning model for smart manufacturing using convolutional LSTM neural network autoencoders." IEEE Transactions on Industrial Informatics 16.9 (2020): pp. 6069-6078 (Year: 2020).*

Satopaa, Ville, et al. "Finding a"kneedle" in a haystack: Detecting knee points in system behavior." 2011 31st international conference on distributed computing systems workshops. IEEE, 2011. DOI: 10.1109/ICDCSW.2011.20. (Year: 2011).*

GB Examination and Search Report of GB Application No. 2218191.1 dated May 30, 2023.

* cited by examiner

SYSTEMS AND METHODS FOR DETECTING MANUFACTURING ANOMALIES

BACKGROUND

The present disclosure related to systems and methods for detecting manufacturing anomalies. More particularly, but not exclusively, the present disclosure relates to providing a system that utilizes unsupervised machine learning to detect anomalous behavior in machine test data in order to detect manufacturing anomalies.

SUMMARY

When manufacturing items (or components) in, for example, a factory, typically a manufacturing process will be followed. A manufacturing process may involve creating items from raw materials and assuming the items into a complex item. For example, if wheel bearings are being manufactured, individual ball bearings may be created, as may metal rings to contain the ball bearings. The ball bearings and metal rings may be assembled to create the wheel bearings. In some examples, all of the steps may take place in the same factory. In other examples, each of (or a sub-set) of the steps may take place in one or more different factories. An important part of the manufacturing process is to identify any anomalies, for example, defects, that arise during the manufacturing process. This may involve, for example, testing items created and/or assembled during the manufacturing process. For example, the aforementioned wheel bearing may be attached to a test point to ensure that it operates in an expected manner, before it is attached to a vehicle. Testing helps to ensure that a final end-product of the manufacturing process is of an expected quality.

One solution is to measure a test response parameter of a manufactured item and compare it against a static limit, for example, measure a high point and a low point, at key points with respect to, for example, time. In another example, suppose an oil pump has been manufactured. Testing the oil pump may comprise measuring an initial oil pressure, at a high limit, and measuring how long it takes to drop to a low limit. To pass the test, the pressure drop may need to occur within a pre-determined time, for example, based on physics and fluid-dynamics. If the response (i.e., the pressure drop) of a manufactured item does occur within the pre-determined time then the test may fail. A failed item may be returned to an earlier part of the manufacturing process so that any manufacturing issues can be addressed. For a complex item, such as a vehicle engine, there may be up to 7000 tests that are performed to help ensure that the engine has been constructed to an expected quality. Given the vast number of tests, these tests are typically automated; however, due to the vast number of tests, it is technically challenging to design suitable pass and/or fail conditions that capture every anomaly, for a given item.

Systems and methods are provided herein for training a model for detecting manufacturing anomalies. For example, the systems and methods provided herein enable a model to be trained, e.g., in an unsupervised manner, on a training data set, and enable the model output to be refined, based on a feedback loop.

According to some examples of the systems and method provided herein, a method of training a model for detecting manufacturing anomalies is provided. A test response parameter is identified at a computing device, and a first plurality of component waveforms associated with the test response parameter are received at the computing device. Each waveform of the plurality of waveforms comprises a plurality of datapoints. A model is generated at the computing device, and the model is trained on the first plurality of component waveforms. The training the model generates one or more parameters associated with the model. A second plurality of component waveforms associated with the test response parameter are received, and the trained model is accessed. Using the trained model, it is indicated whether any of the waveforms of the second plurality of component waveforms comprises an anomaly. Each indicated waveform is reviewed. For each reviewed waveform not comprising an anomaly, the waveform is labelled. In some examples, all the indicated waveforms are labelled, with the label reflecting a status of the indicated waveform. In some examples, all subsequent pluralities of anomalous waveforms will then be compared to these labelled waveforms not comprising an anomaly, and, based on this comparison, the output of the model applied to subsequent pluralities of waveforms may be adjusted, for example, corrected, changed and/or overridden. In an example system, a test response parameter may be identified, for example, oil pressure. A plurality of component waveforms may be received, for example, a plurality of waveforms indicating how the oil pressure of an oil pump falls with time. A model may be generated and trained on these waveforms, including generating one or more parameters associated with the model. A second plurality of waveforms indicating how the oil pressure of an oil pump falls with time may be received and processed using the trained model. Any waveforms that the trained model indicates as anomalous may be flagged for review by a subject matter expert. On review, the subject matter expert may indicate whether the waveforms are anomalous, or whether the trained model has indicted a false positive. For the false positives, the waveform may be labelled and used to override the output of future anomaly classifications.

In some examples, the first plurality of component waveforms may be a pre-determined number of waveforms, and the first plurality of component waveforms may be a subset randomly selected from a larger plurality of component waveforms.

In some examples, training the model may further comprise generating a reduced feature space associated with the first plurality of component waveforms. Generating the reduced the feature space may further comprise applying a Z-standardization to the first plurality of component waveforms, thereby producing a result, and passing the result to a linear principal component analysis. The number of principal components may be based on setting a lower bound on the percentage total of variance explained by first principal components, and/or the knee point in a cumulative explained variance plot. A transformation matrix may be generated, and stored, based on the reduced feature space. Indicating whether any of the waveforms of the second plurality of component waveforms comprises an anomaly may further comprise mapping the second plurality of component waveforms to the same reduced feature space via the transformation matrix.

In some examples, the data points in the reduced feature space may be clustered via a density-based spatial clustering of applications with noise algorithm. The clustering may comprise identifying one or more core-points, and assigning one or more data points to a cluster, wherein a cluster is based on a core point. A noise point may be any data point that is not assignable to a cluster. Indicating whether any of the waveforms comprises an anomaly may be further based on identifying one or more noise points. The one or more core points may be characterized by containing a minimum number of data points within a radius of neighborhood. The data points may be assigned to a cluster if they are density reachable from the same core point, wherein a density reachable point is a point for which there is a chain of points from a core point to the point.

In some examples, generating the model parameters may further comprise determining the minimum number of data points and determining the radius of neighborhood. Training the model may further comprise generating cluster labels for each cluster and storing the generated cluster labels. The minimum number of data points may be two times the number of principal components, and the radius of neighborhood may be the elbow point in a k-distance graph, wherein k is the minimum number of data points minus one.

In some examples, a test response parameter is identified at a computing device, a component waveform associated with the test response parameter is received at the computing device. The component waveform may comprise a plurality of data points. A trained model may be accessed at the computing device and based on the test response parameter. It may be determined, using the trained model, whether the component waveform indicates an anomaly. In some examples, receiving the component waveform may comprises receiving a plurality of waveforms associated with the test response parameter. Determined whether the component waveform indicates an anomaly may comprise determining whether each waveform of the plurality of waveforms indicates an anomaly. It may be determining whether a threshold number of sequential waveforms in the plurality of waveforms indicate an anomaly and/or it may be determined whether a threshold subset of data points of the plurality of waveforms have drifted from an expected position in each of the waveforms.

In some examples, a test response parameter is identified at a computing device, a component waveform associated with the test response parameter is received at the computing device. The component waveform may comprise a plurality of data points. A trained model may be accessed at the computing device and based on the test response parameter. The trained model may be used to assign the data points to clusters, if a data point is within a neighborhood radius of a cluster. It may be determined, using the trained model, whether a data point is a noise point. It may be indicated that the component waveform indicates an anomaly if any of the data points are a noise point.

In some examples, there may be provided apparatus for manufacturing vehicle components, wherein a process associated with the apparatus comprises testing a vehicle component for an anomaly as described herein.

FIGURES

The above and other objects and advantages of the disclosure will be apparent upon consideration of the following detailed description, taken in conjunction with the accompanying drawings, in which.

DETAILED DESCRIPTION

Figure 1:
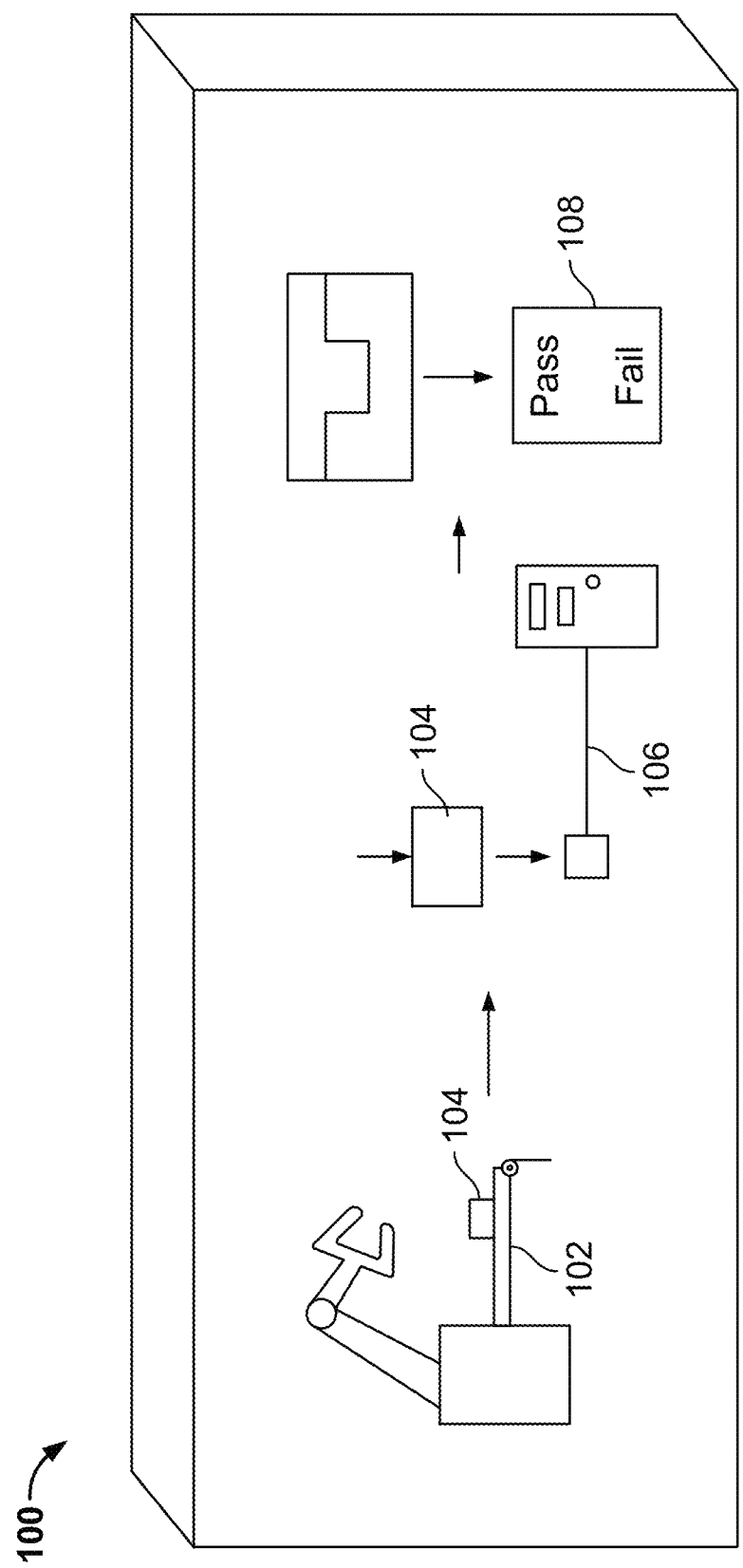
FIG. 1 illustrates an example environment in which there is provided apparatus for manufacturing and testing vehicle components, in accordance with some examples of the disclosure.

FIG. 1 illustrates an example environment in which there is provided apparatus for manufacturing and testing vehicle components, in accordance with some examples of the disclosure. A factory 100 comprises manufacturing equipment 102 for manufacturing components 104, for example, vehicle components. The component 104 is test at a testing point 106, where the test results are transmitted to a computing device. At the computing device, a trained model is used to analyze 108 the results of the test that was run at the testing point 106 and an indication of whether there is an anomaly associated with the component 104 is generated.

Figure 2:
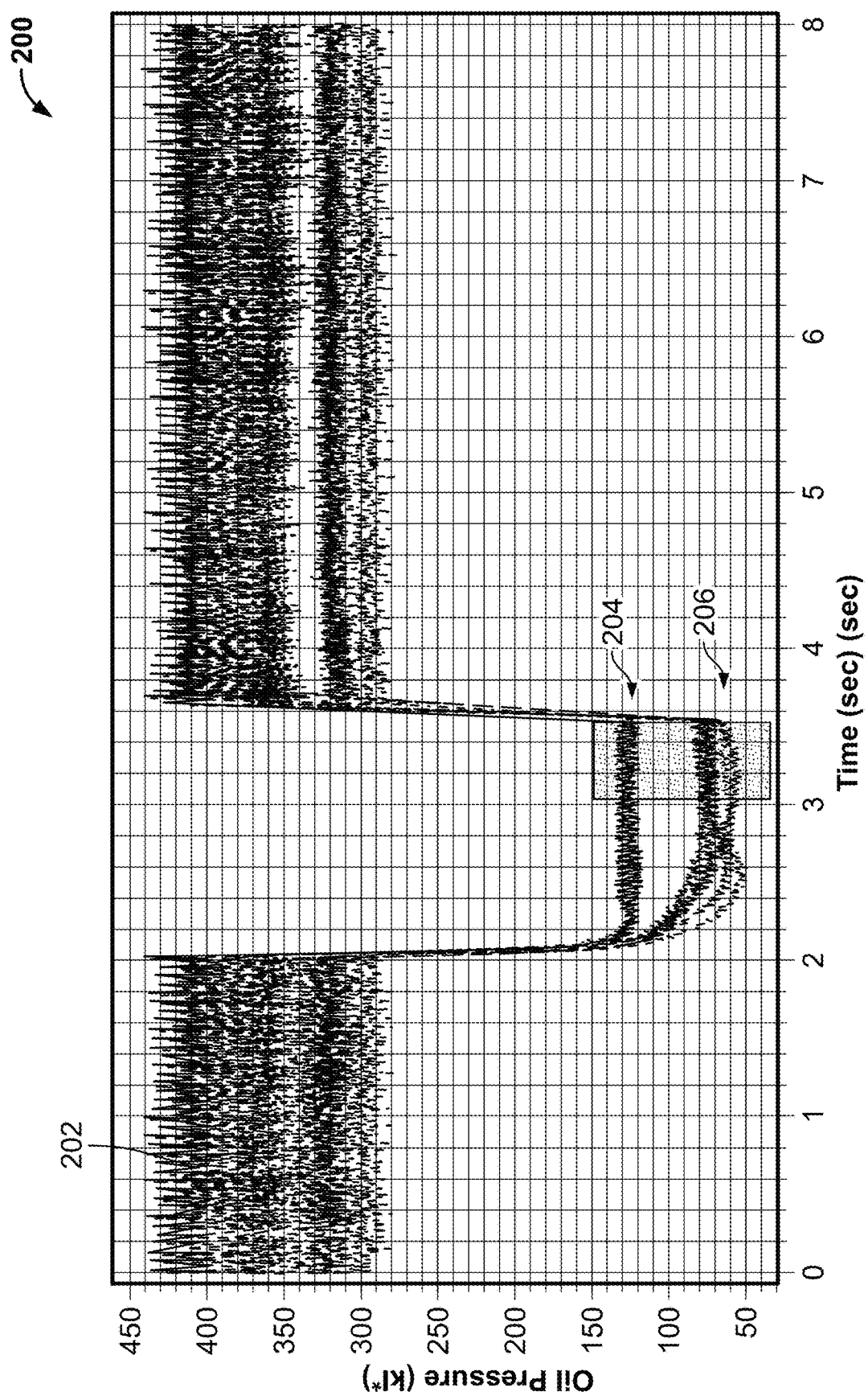
FIG. 2 illustrates a plurality of example waveforms, in accordance with some examples of the disclosure.

FIG. 2 illustrates a plurality of example waveforms, in accordance with some examples of the disclosure. A graph 200 shows a plurality of example waveforms 202. Each of the waveforms 202 comprise a plurality of data points, indicating how a test response parameter, in this example, oil pressure changes with time during a test. In this test, the oil pressure falls from a first, high, value to a second, low value. With time, the oil pressure increases from the low value, back to the high value. The waveforms pass through a window, which typically would indicate that all of the waveforms are associated with a pass result of the test. However, a first subset 204 of the plurality of waveforms are anomalous, as they pass through the window at a higher value that a second subset 206 of the plurality of waveforms. A model trained as described herein may identify the first subset 204 of waveforms as anomalous, despite them passing though a window typically associated with a pass result.

Figure 3:
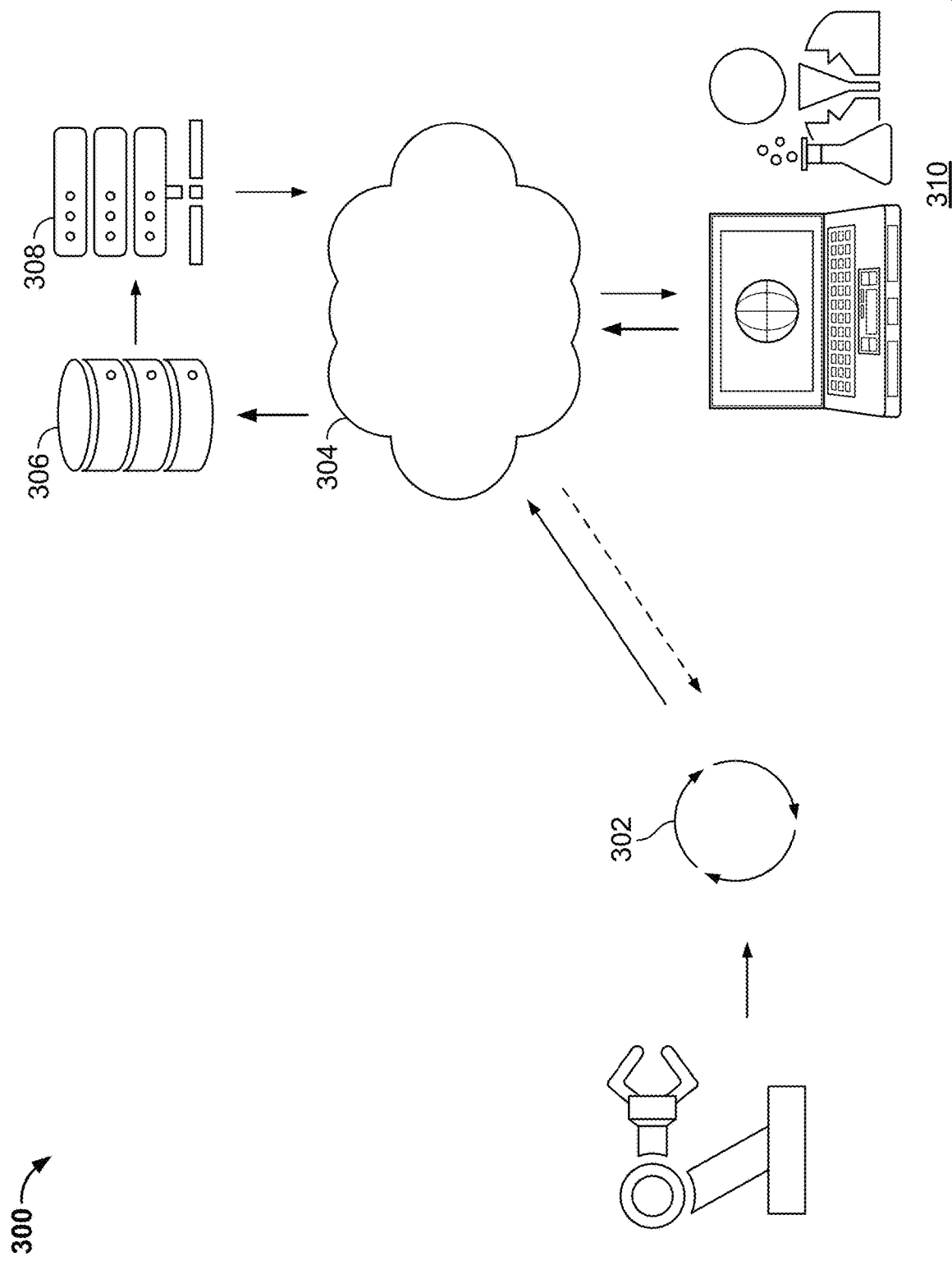
FIG. 3 illustrates an example environment for training a model for detecting manufacturing anomalies, in accordance with some examples of the disclosure.

FIG. 3 illustrates an example environment for training a model for detecting manufacturing anomalies, in accordance with some examples of the disclosure. A manufacturing process 300 generates test results (e.g., waveforms) associated with manufactured components. At a computing device 302, these test results are received, processed and used to train a machine learning model. The model is run on subsequent test results and test results that are indicated as anomalous by the model are transmitted, via a network 304, to a database 306. The anomalous results are optionally available through a web form 308 (or dashboard) and are accessed by a reviewer 310, for example, a subject matter expert. Any false positives (i.e., test results incorrectly identified by the model as being anomalous) are labelled by the reviewer and are transmitted, via the network 304, to the computing device 302, to enable the training data (i.e., the test results) to be updated to reduce the number of false positives.

The system consists of converting sets of waveforms to a metric that quantifies similarity of each waveform to other waveforms in the dataset. In an example system, low values correspond to pairs of waveforms that are considered very similar and high values to pairs of dissimilar waveforms. These metrics can be obtained through various different methods, for example, through Euclidean distance of reduced components obtained by a principal component analysis (PCA) or t-distributed stochastic neighbor embedding (t-SNE), dynamic time warping distances or the latent space of autoencoders.

Based on these similarity values, anomalies may be detected using a clustering algorithm, for example, by density-based clustering in applications with noise (DBSCAN). In a post processing step, the detected anomalies may be compared to a reference set of waveforms that previously have been classified as not anomalous. In some examples, a set of previously detected anomalies may be assessed and reclassified by a subject matter expert. The similarity metric may be established between the detected anomaly and the reference set. Based on a threshold value for the similarity, it may be decided to refrain from classifying the detected anomaly as anomalous.

A model may be trained for each particular test that is to be run on a component, or components. Each time a component is tested, a new waveform (i.e., a series of data points with respect to time) associated with that component and the test run on the component is generated. For training a model that detects anomalies for an individual waveform for a particular component test, a first step may comprise randomly selecting a pre-set number, "n," of historic waveforms associated with that test. A Z-standardization may be applied to the waveforms and the result may be passed to a linear PCA to perform a dimensionality reduction (or reduce the feature space). Each time step in the time series of the waveform corresponds to one of the "m" features. The number of principal components of the PCA, where the number of principal components is less than or equal to the number of features is automatically chosen based on different heuristics. The heuristics may include setting a lower bound on the percentage of total variance that is explained by the first principal components, and/or the knee point in a cumulative explained variance plot using, for example, the method described in DOI: 10.1109/ICDCSW.2011.20, which is hereby incorporated by reference. A transformation matrix is generated, and the resulting transformation matrix may be stored and used for mapping the time series data of new test runs (i.e., when using the trained model to detect anomalies for test results of manufactured components) to the same reduced feature space.

The data points are then clustered in the reduced space using a DBSCAN algorithm. Based on a given metric, "d," and two parameters, "eps" (i.e., a radius of neighborhood around a point) and "min_pts," (i.e., the minimum number of neighbors within the "eps" radius) the algorithm finds "core-points" that are characterized by containing at least "min_pts" in the "eps-neighborhood" with regards to "d." Any two given points "a, b" are then assigned to the same cluster, if and only if, they both are "density-reachable" (i.e., there are a set of core points leading from "b" to "a") from the same core-point, using, for example, the method described in Martin Ester, Hans-Peter Kriegel, Joerg Sander, Xiaowei Xu (1996). *A Density-Based Algorithm for Discovering Clusters in Large Spatial Databases with Noise. Institute for Computer Science, University of Munich. Proceedings of 2nd International Conference on Knowledge Discovery and Data Mining* (KDD-96), 226-231 (Ester), which is hereby incorporated by reference. Any data point that is not assignable to a cluster in this fashion may be called noise-point (i.e., one that indicates an anomalous test result).

Training the model may comprise detecting and storing parameters, such as "eps" and "min_pts," applying the DBSCAN clustering algorithm on the training set of waveforms in the reduced feature space and storing resulting cluster labels for each training record.

Based on the heuristics described in section 4.2 of Ester, the parameter "min_pts" may be chosen as two times the number of principal components, and the parameter "eps" may be chosen as the elbow-point in a k-distance graph, where k="min_pts" minus one, again using the method described in DOI: 10.1109/ICDCSW.2011.20, which is hereby incorporated by reference.

When using the trained model to analyze new waveforms, a new unseen data point "a" is assigned to the same cluster as the closest cluster point "c" from the training set with "d(a,c)" less than or equal to "eps" and may be considered a noise point if no such training point c exists.

A feedback mechanism may comprise a subject matter expert reviewing the anomalies detected by the unsupervised method described above. If a waveform has been falsely identified as being anomalous (i.e., a false positive), the subject matter expert may assign a label to the waveform, or data point of the waveform. This label can be used to prevent classifying future, similar test runs as anomalies. Similar may be defined as being close to labeled items in feature space. In one example, no labelled data is added to the training set, but rather it overrides the unsupervised classification for those points, that have a distance smaller than "eps" to any labeled data point.

Figure 4:
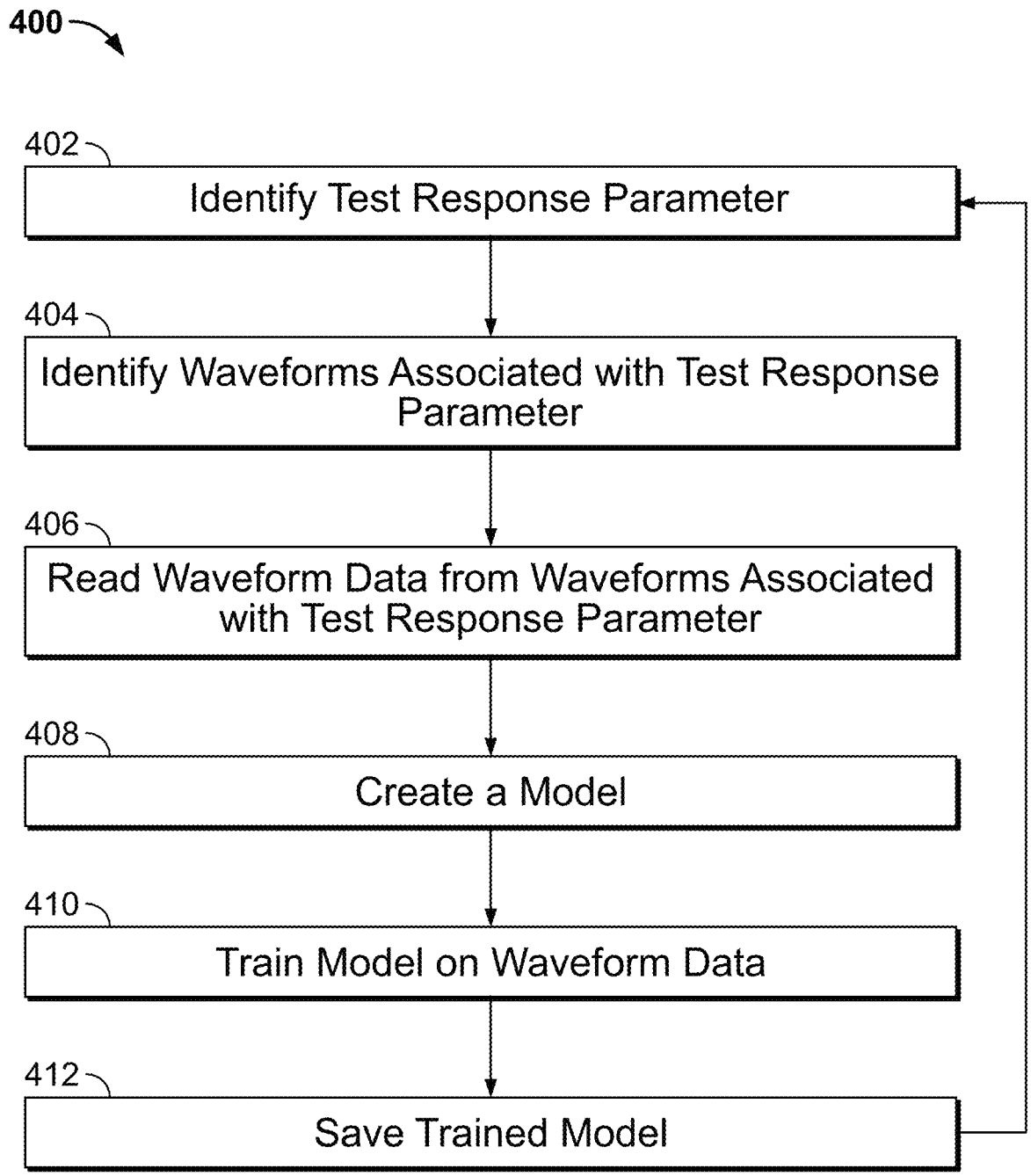
FIG. 4 illustrates a schematic diagram of a process flow for training a model for detecting manufacturing anomalies, in accordance with some examples of the disclosure.

FIG. 4 illustrates a schematic diagram of a process flow for training a model for detecting manufacturing anomalies, in accordance with some examples of the disclosure. Process 400 may run on any computing device. At 402, a test response parameter is identified. At 404, waveforms associated with the test response parameter are identified. At 406, waveform data is read from the waveforms associated with the test response parameter. At 408, a model is created. At 410, the model is trained on the waveform data. At 412, the trained model is saved.

Figure 5:
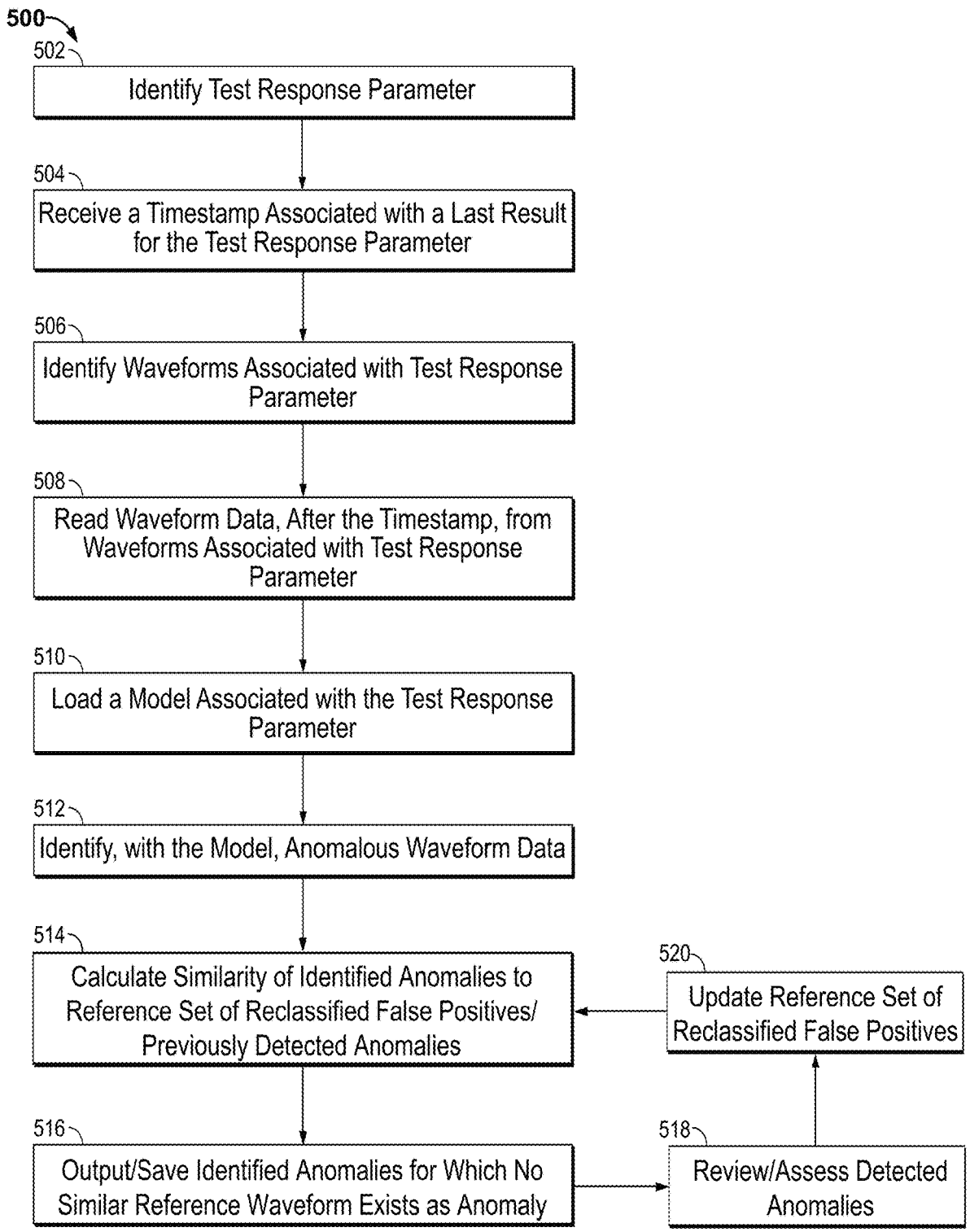
FIG. 5 illustrates another schematic diagram of a process flow for training a model for detecting manufacturing anomalies, in accordance with some examples of the disclosure.

FIG. 5 illustrates another schematic diagram of a process flow for training a model for detecting manufacturing anomalies, in accordance with some examples of the disclosure. Process 500 may run on any computing device. At 502, a test response parameter is identified. At 504, a timestamp associated with a last result for the test response parameter is received. At 506, waveforms associated with the test response parameter are identified. At 508, the waveform data from after the timestamp is read, where the waveform data is from waveforms associated with the test response parameter. At 510, a model associated with the test response parameter is loaded. At 512, the model is used to identify anomalous waveform data. At 514, the similarity of the identified anomalies to the reference set of reclassified false positives/previously detected anomalies is calculated. At 516, the identified anomalies for which no similar reference waveform exists are output/saved as an anomaly. At 518 the detected anomalies are reviewed and/or assessed. In some examples, this step may be carried out by a computing device. In other examples, the step may be carried out by a subject matter expert. At 520, the reference set of reclassified false positives is updated.

Figure 6:
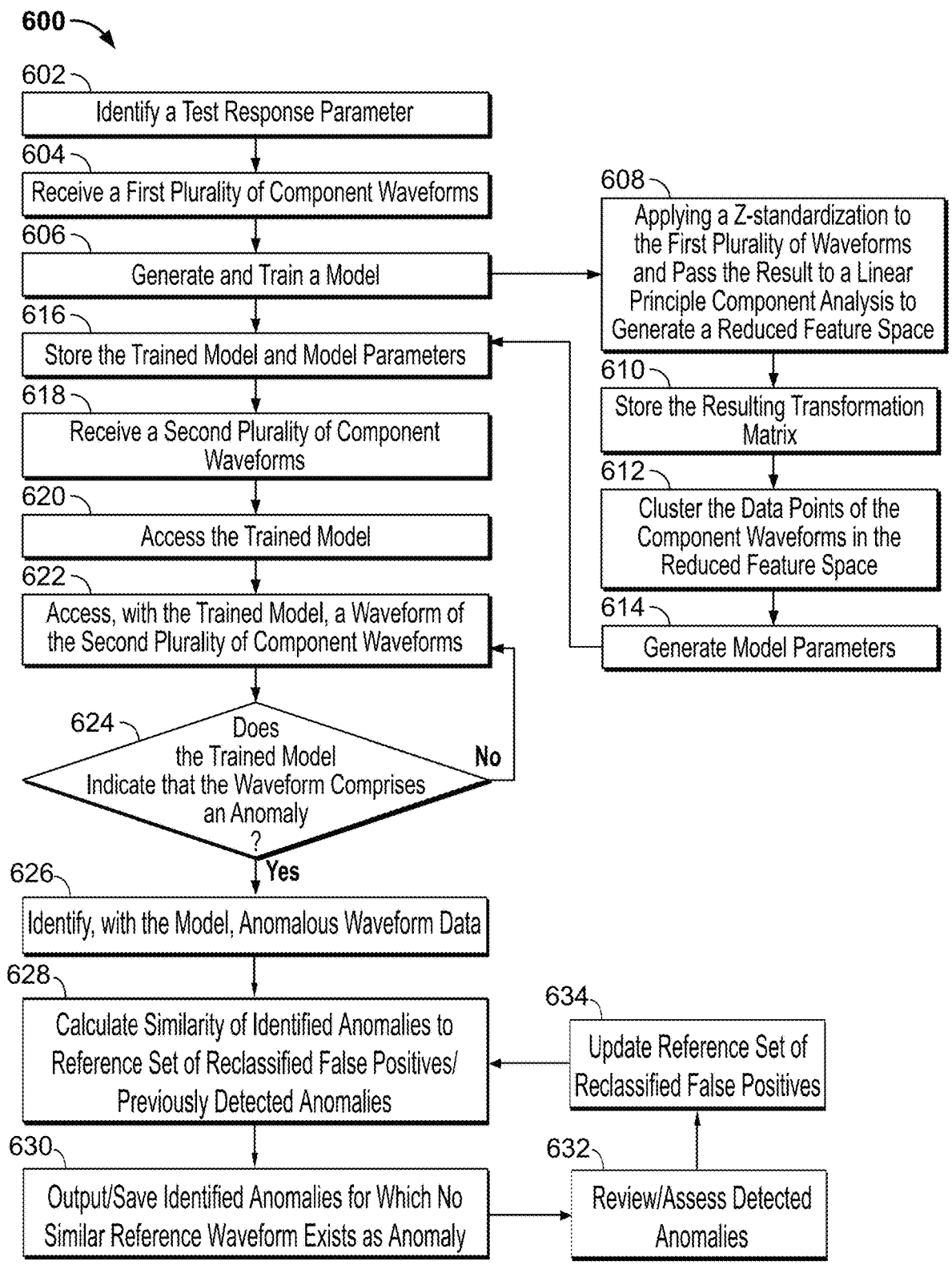
FIG. 6 illustrates another schematic diagram of a process flow for training a model for detecting manufacturing anomalies, in accordance with some examples of the disclosure.

FIG. 6 illustrates another schematic diagram of a process flow for training a model for detecting manufacturing anomalies, in accordance with some examples of the disclosure. Process 600 may run on any computing device. At 602, a test response parameter is identified. At 604, a first plurality of component waveforms is received. At 606, a model is generated and trained. At 608, a Z-standardization is applied to the first plurality of waveforms and the result is passed to a linear principal component analysis to generate a reduced feature space. At 610, the resulting transformation matrix is stored. At 612, the data points of the component waveforms are clustered in the reduced feature space. At 614, the model parameters are generated. At 616, the trained model and model parameters are stored. At 618, a second plurality of component waveforms are received. At 620, the trained model is accessed. At 622, a waveform of the second plurality of waveforms is accessed with the trained model. At 624 it is determined whether the trained model indicates that the waveform comprises an anomaly. If it does not, the next waveform in the plurality of waveforms is accessed at 622. If the waveform is indicated as comprising an anomaly, at 626, the model is used to identify anomalous waveform data. At 628, the similarity of the identified anomalies to the reference set of reclassified false positives/previously detected anomalies is calculated. At 630, the identified anomalies for which no similar reference waveform exists are output/saved as an anomaly. At 632 the detected anomalies are reviewed and/or assessed. In some examples, this step may be carried out by a computing device. In other examples, the step may be carried out by a subject matter expert. At 534, the reference set of reclassified false positives is updated.

In some examples, if a plurality of sequential waveforms are identified as being anomalous, it may indicate that there is an issue with the test equipment itself. A threshold number of sequential anomalous waveforms may be set and, if the threshold is reached, an automatic alert trigger may be sent to interrupt production and/or alert production staff.

In another example, if a drift of the data points of a plurality of waveforms is identified, it may indicate wear of the assembly and/or testing equipment. Again, if a threshold number of drift data points are identified, an automatic alert trigger may be sent to interrupt production and/or alert production staff.

While the present disclosure is described with reference to particular example applications, it will be appreciated that the disclosure is not limited hereto and that particular combinations of the various features described and defined in any aspects can be implemented and/or supplied and/or used independently. It will be apparent to those skilled in the art that various modifications and improvements may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system features as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

What is claimed is:

1. A method comprising:
    performing a manufacturing process that comprises steps of:
        manufacturing at least one ball bearing;
        manufacturing a metal ring;
        assembling the at least one ball bearing with the metal ring to manufacture a wheel bearing;
    at a particular step of the manufacturing process attaching the wheel bearing to a test point to generate component waveforms;
    identifying, at a computing device, a test response parameter of a wheel bearing;
    receiving, at the computing device, a first plurality of component waveforms associated with the test response parameter from the test point, wherein each waveform of the plurality of waveforms comprises a plurality of datapoints;
    generating, at the computing device, a model;
    training, at the computing device and on the first plurality of component waveforms, the model, thereby generating one or more parameters associated with the model,
    wherein training the model further comprises generating a reduced feature space associated with the first plurality of component waveforms,
    wherein the generating the reduced feature space further comprises:
        applying a Z-standardization to the first plurality of component waveforms, thereby producing a result; and
        passing the result to a linear principal component analysis;
    clustering the data points in the reduced feature space via a density-based spatial clustering of applications with noise algorithm, wherein the clustering comprises:
        identifying one or more core-points, wherein the one or more core points are characterized by containing a minimum number of data points within a radius of neighborhood, wherein the generating the one or more parameters associated with the model further comprises:
            determining the minimum number of data points as two times a number of principal components of the linear principal component analysis; and
            determining the radius of neighborhood as the elbow point in a k-distance graph, wherein k is the minimum number of data points minus one;
    assigning one or more data points to a cluster, wherein a cluster is based on a core point, wherein the training the model further comprises generating cluster labels for each cluster and storing the generated cluster labels;
    receiving a second plurality of component waveforms associated with the test response parameter from the test point;
    accessing the trained model;
    indicating, using the trained model, whether any of the waveforms of the second plurality of component waveforms comprises an anomaly; and, for each indicated waveform:
    reviewing the indicated waveform;
    for each reviewed waveform not comprising an anomaly:
    labelling the waveform; and
    based at least in part on at least one of the indicated waveforms comprising an anomaly:
        returning the wheel bearing to one of the steps of the manufacturing process preceding the particular step.

2. The method of claim 1, wherein:
    the first plurality of component waveforms is a predetermined number of waveforms; and
    the first plurality of component waveforms is subset randomly selected from a larger plurality of component waveforms.

3. The method of claim 1, wherein generating the reduced feature space further comprises:
applying a Z-standardization to the first plurality of component waveforms, thereby producing a result; and
passing the result to a linear principal component analysis.

4. The method of claim 3, wherein a number of principal components of the linear principle component analysis is based on:
setting a lower bound on the percentage total of variance explained by first principal components; and/or
the knee point in a cumulative explained variance plot.

5. The method of claim 1, further comprising:
generating a transformation matrix based on the reduced feature space;
storing the transformation matrix; and wherein:
indicating whether any of the waveforms of the second plurality of component waveforms comprises an anomaly further comprises mapping the second plurality of component waveforms to the same reduced feature space via the transformation matrix.

6. The method of claim 1, wherein:
a noise point is any data point that is not assignable to a cluster; and
indicating whether any of the waveforms comprises an anomaly is further based on identifying one or more noise points.

7. A method of testing manufactured components for anomalies, the method comprising:
identifying, at a computing device, a test response parameter;
receiving, at the computing device, a component waveform associated with the test response parameter, wherein the component waveform comprises a plurality of data points;
accessing, at the computing device and based on the test response parameter, a model trained in accordance with the method of claim 6;
assigning the data points to the clusters, with the trained model, if a data point is within a neighborhood radius of a cluster;
determining, using the trained model, whether a data point is a noise point;
indicating that the component waveform indicates an anomaly if any of the data points are a noise point.

8. The method of claim 1, wherein the data points are assigned to a cluster if they are density reachable from the same core point, wherein a density reachable point is a point for which there is a chain of points from a core point to the point.

9. A method for detecting manufacturing anomalies, the method comprising:
receiving, at a computing device, a third plurality of waveforms;
analyzing, with the model of claim 1, the third plurality of waveforms, wherein the analyzing comprises comparing the third plurality of waveforms to the labelled waveforms; and
applying, based on the comparison, an adjustment to an output of the model.

10. A method of testing manufactured components for anomalies, the method comprising:
identifying, at a computing device, a test response parameter;
receiving, at the computing device, a component waveform associated with the test response parameter, wherein the component waveform comprises a plurality of data points;
accessing, at the computing device and based on the test response parameter, a model trained in accordance with the method of claim 1; and
determining, using the trained model, whether the component waveform indicates an anomaly.

11. The method of claim 10, wherein:
receiving the component waveform comprises receiving a plurality of waveforms associated with the test response parameter;
determining whether the component waveform indicates an anomaly comprises determining whether each waveform of the plurality of waveforms indicates an anomaly; and the method further comprises:
determining whether a threshold number of sequential waveforms in the plurality of waveforms indicate an anomaly.

12. The method of claim 10, wherein a waveform comprises a plurality of data points, the method further comprising:
receiving the component waveform comprises receiving a plurality of waveforms associated with the test response parameter;
determining whether the component waveform indicates an anomaly comprises determining whether each waveform of the plurality of waveforms indicates an anomaly; and
the method further comprises:
determining whether a threshold subset of data points of the plurality of waveforms have drifted from an expected position in each of the waveforms.

13. Apparatus for manufacturing vehicle components, wherein a process associated with the apparatus comprises testing a vehicle component for an anomaly in accordance with the method of claim 10.

* * * * *